(12) United States Patent
Farnstrom

(10) Patent No.: US 10,083,486 B2
(45) Date of Patent: Sep. 25, 2018

(54) LIMITED MOVEMENT COLLAR ON MARKETABLE ORDER EXECUTION PRICE

(71) Applicant: NYSE Group, Inc., New York, NY (US)

(72) Inventor: Amy Joy Farnstrom, Oakland, CA (US)

(73) Assignee: NYSE Group, Inc., New York, NY (US)

( * ) Notice: Subject to any disclaimer, the term of this patent is extended or adjusted under 35 U.S.C. 154(b) by 283 days.

(21) Appl. No.: 14/578,982

(22) Filed: Dec. 22, 2014

(65) Prior Publication Data

US 2015/0112851 A1 Apr. 23, 2015

Related U.S. Application Data

(60) Provisional application No. 61/922,606, filed on Dec. 31, 2013.

(51) Int. Cl.
*G06Q 40/04* (2012.01)

(52) U.S. Cl.
CPC .................... *G06Q 40/04* (2013.01)

(58) Field of Classification Search
CPC ........ G06Q 40/04; G06Q 40/06; G06Q 40/00; G06Q 30/08; G06Q 40/02
USPC ................................. 705/37, 36 R
See application file for complete search history.

(56) References Cited

U.S. PATENT DOCUMENTS

| | | | |
|---|---|---|---|
| 8,121,933 B1 * | 2/2012 | Mittal | G06Q 40/00 705/35 |
| 8,239,303 B2 * | 8/2012 | Martyn | G06Q 40/04 705/35 |
| 2006/0020536 A1 * | 1/2006 | Renton | G06Q 40/00 705/37 |
| 2006/0178981 A1 * | 8/2006 | Janian | G06Q 40/04 705/37 |
| 2006/0253354 A1 * | 11/2006 | O'Callahan | G06Q 40/00 705/35 |
| 2006/0253379 A1 * | 11/2006 | Adcock | G06Q 40/04 705/37 |
| 2006/0253380 A1 * | 11/2006 | Adcock | G06Q 40/04 705/37 |

(Continued)

FOREIGN PATENT DOCUMENTS

WO WO 2005/045613 * 5/2005

OTHER PUBLICATIONS

NYSE: Automatic Executions (Rules 1000-1004), May 30, 2010, pp. 1-6.*

(Continued)

*Primary Examiner* — Bijendra K Shrestha
(74) *Attorney, Agent, or Firm* — DLA Piper LLP (US)

(57) ABSTRACT

An electronic trading system implements collar protection for received marketable orders. A collar price is determined based on best bid and offers prices or the price of a recently executed trade. Orders matched at prices worse than the collar price (from the perspective of the marketable order) are not allowed to execute. When execution of orders is halted, a collar timer runs. When the collar timer exceeds a time threshold, the collar price is modified based on a collar move parameter. The collar move parameter may be modified when the reset collar timer subsequently exceeds the time threshold.

30 Claims, 4 Drawing Sheets

(56) References Cited

U.S. PATENT DOCUMENTS

| | | | | |
|---|---|---|---|---|
| 2007/0100734 A1* | 5/2007 | Berger | ............. | G06Q 40/00 705/37 |
| 2007/0136181 A1* | 6/2007 | Miller | ............. | G06Q 40/04 705/37 |
| 2007/0199734 A1* | 8/2007 | Kudo | ............. | H01F 17/0013 174/255 |
| 2008/0094077 A1* | 4/2008 | Philipp | ............. | G06F 3/044 324/686 |
| 2008/0228623 A1 | 9/2008 | Adcock et al. | | |
| 2012/0197774 A1* | 8/2012 | Gallagher | ............. | G06Q 40/04 705/37 |
| 2014/0046824 A1* | 2/2014 | Cooper | ............. | G06Q 40/00 705/37 |
| 2014/0136395 A1* | 5/2014 | Dowling | ............. | G06Q 40/04 705/37 |
| 2015/0046315 A1* | 2/2015 | Farrell | ............. | G06Q 40/04 705/37 |
| 2015/0186998 A1* | 7/2015 | Buck | ............. | G06T 11/206 705/37 |

OTHER PUBLICATIONS

NYSE Euronext: Order Protection, Apr. 20, 2010, pp. 1-4.*
Szado et al: Risk Mitigating Collar Strategy—Loosening Your Collar: Alternative Implementations of QQQ Collars, Fall 2010, The Options Industry Council (OIC), pp. 1-16. (Year: 2010).*
Singapore Office Action dated Jul. 27, 2017, of corresponding Singapore Application No. 10201408815W.

* cited by examiner

LIMITED MOVEMENT COLLAR ON MARKETABLE ORDER EXECUTION PRICE

TECHNICAL FIELD

The disclosure generally relates to the field of electronic trading systems, and in particular, systems for handling limit and market orders.

BACKGROUND

Some financial products trade in illiquid markets, which indicate that there are low quantities of financial instruments at desirable prices. As a result, orders (or portions of orders) in illiquid markets may execute at substantially worse prices than nationally available prices in other markets. As a result, there is a need for systems, methods and apparatus to control and/or limit the price at which an order may execute, particularly in illiquid markets.

SUMMARY

In one embodiment, a disclosed system, method and computer readable storage medium executes trades subject to a collar. The exchange receives orders from market participants including agency brokers, market makers, and proprietary traders. A received order specifies at least a financial instrument, a quantity, and a side of the order (e.g., buy or sell), and some received orders specify a limit price. The exchange matches orders having opposite sides at a match price.

An execution manager monitors match prices of matched orders and suspends execution of orders subject to a collar. The collar ensures that received marketable orders are executed at a match price better than a collar price. The collar price is determined based on a best bid price, a best offer price, or a price of an executed trade. When no marketable orders can execute due to the collar, a collar timer is initiated. Once the collar timer exceeds a time threshold (e.g., referred to as "a collar timer expiration"), the collar price may move. The collar price is modified based on a collar move parameter. In one embodiment, the collar move parameter is modified responsive to a collar timer expiration. In one embodiment, at least the unmatched balance of a marketable order suspended by the collar is canceled following collar timer expirations exceeding a timer expiration limit.

In one embodiment, the collar price is calculated based on a collar range value, which determines the difference between the collar price and a posting price. In one embodiment, the posting price is determined based on the best bid, the best offer, and/or a recently executed transaction price. In one embodiment, determining the posting price may include an offset called the first posting parameter from the best bid, the best offer, or the recently executed transaction price. In one embodiment, determining the posting price may include determining if the market is wide, which is based on comparing the difference between the best bid and best offer to a legal width parameter. Based on whether the market is wide, the execution manager uses different criterion to determine the posting price.

The disclosed embodiments beneficially allow for reduced collar movement. When the collar suspends execution of a market participant's order, the market participant can cancel the order. The use of the collar timer gives market participants a defined window to reconsider trades that may otherwise execute at unintended prices. Reducing the collar move parameter for successive timer expirations limits price movement. Cancelling unmatched portions of an order protects a market participant from making errant trades at worse prices than expected. To prevent collar movement due to panic behavior such as activation of stop orders, the exchange moves the collar price in response to executions against limit orders while ignoring executions against market orders.

The features and advantages described in the specification are not all inclusive and, in particular, many additional features and advantages will be apparent in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description and the accompanying figures (or drawings). A brief introduction of the figures is below.

DETAILED DESCRIPTION

Overview

Figure 1:
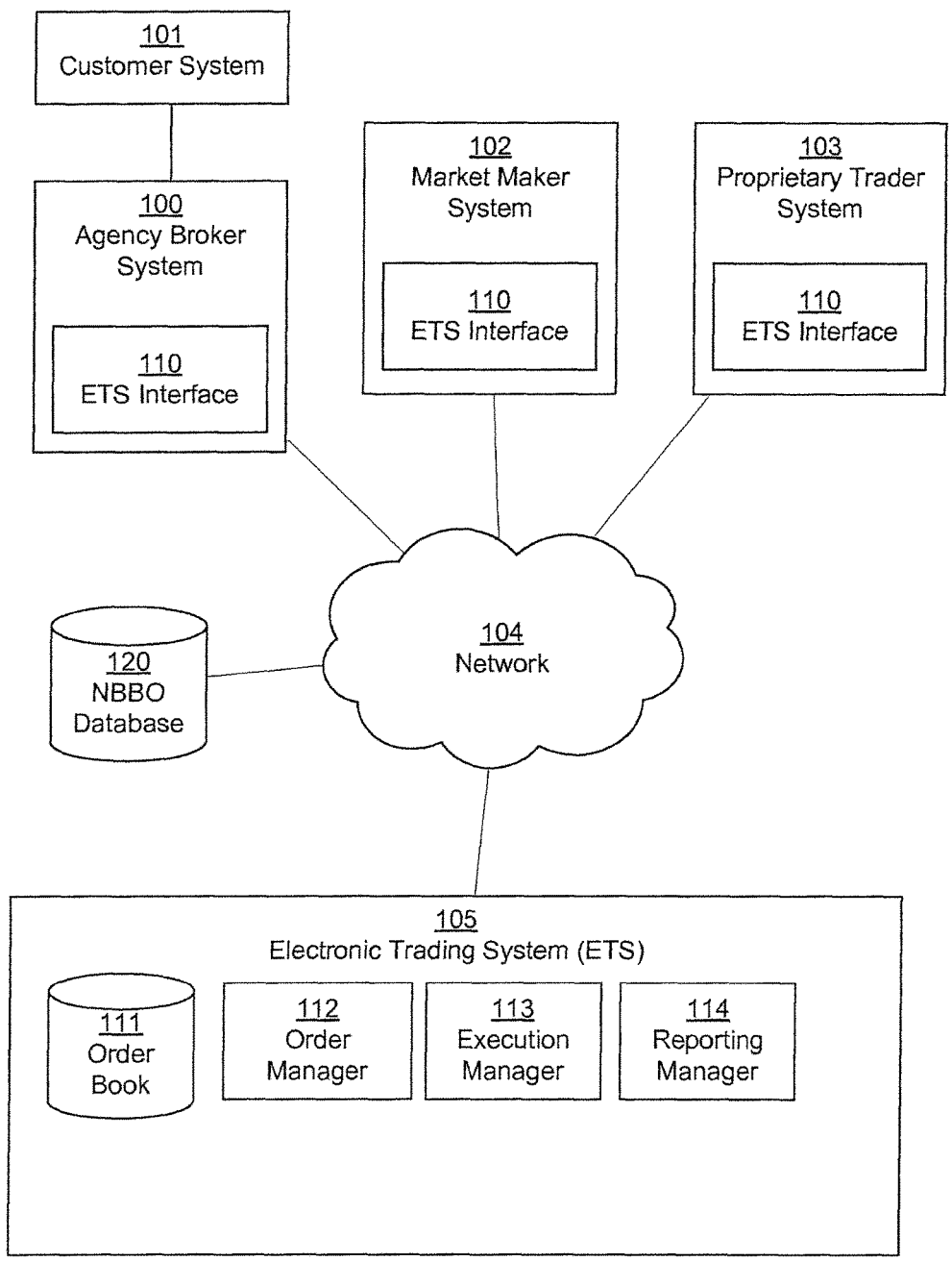
FIG. 1 illustrates a block diagram of a system architecture diagram of an electronic trading system (ETS) in a networked environment, consistent with one embodiment.

An electronic trading system provides a central market place where both buyers and sellers (often referred to as traders or market participants) can buy or sell financial instruments. Traders may connect to the electronic trading system via their own trading computers, which can receive market data from the electronic trading system, and which can issue commands to buy or sell specific financial instruments. The issuance of commands to buy or sell financial instruments from a trading computer to the electronic trading system may be called electronic trading (or trading, for short). Because the electronic trading systems facilitate the exchange of various financial instruments, the electronic trading systems may be referred to as electronic exchanges. Agency brokers are market participants that can issue orders to trade to the electronic trading system on the behalf of other parties.

Electronic trading systems may facilitate the exchange of financial instruments such as cash, currency, a currency index, a commodity, a stock, a stock market index, a banknote, a bond, other financial instruments whose value is based at least in part on interest rates, an option, a futures contract, a swap, other derivatives, and other assets. Electronic trading systems support limit orders and market orders. A limit order is an order to buy or sell a set quantity of financial instruments at a pre-determined price or better. Better denotes a higher price when selling and a lower price when buying. A market order is an order to buy or sell a set quantity of financial instruments at the prevailing market price until the specified quantity has been met or the order cancelled. A market order has no price at which to trade, so it is executed at whatever price is currently prevailing in the market. Electronic trading systems may also support stop orders, which specify an activation price and a set quantity of financial instruments to buy or sell. When the price reaches the activation price or worse, the stop order becomes a market order for the set quantity of financial instruments. Worse denotes a lower price when selling and a higher price when buying.

When a market participant issues an order to an electronic trading system to sell a financial instrument, the electronic trading system may attempt to match the sell order with an existing buy order that has a price that satisfies the seller's price requirements. Similarly, when a market participant issues an order to buy a financial instrument, the electronic system may attempt to match the buy order with an existing sell order. If a market participant issues a limit order that meets the limit order's price requirements, the limit order may be referred to as a marketable order and may execute against the counterparty order. If a market participant issues a limit order that cannot be matched to a counterparty order meeting the limit order's price requirements, then the limit order may be referred to as a non-marketable order.

Received orders may be stored in an electronic order book. The electronic order book may store unexecuted and/or non-marketable orders until a matching order can be found to execute a trade, or until the order is cancelled. Buy orders stored in the order book may be referred to as bids, and stored sell orders may be referred to as offers. The difference between the highest bid on the order book and the lowest offer may be called the best bid-offer (BBO) spread. Price information about bids and offers for equity option contracts in various electronic markets in the United States are tracked by the Options Price Reporting Agency (OPRA). OPRA maintains a database of the best bids and offers for each tracked option called the National Best Bids and Offers (NBBO) database. The NBBO price refers to the prices of the best bid and the best offer while the NBBO spread refers to the price difference between the best bid and best offer.

Agency brokers may provide trading services for large volumes of customers, and may also trade for their own account, subject to the rules and regulations of the electronic markets and of the U.S. Securities & Exchange Commission (SEC). When a customer places an order to buy or sell equity options through an agency broker, the agency broker may have existing customer orders that can be matched against the order, or the agency broker may be able to act as a counterparty directly by trading for their own account. However, instead of directly executing such orders internally, an agency broker may be required, by rules or regulations, to place an order with an electronic exchange in case a third-party is willing to offer a better price for the customer's order than that offered internally by the agency broker. An electronic trading system may facilitate such orders.

Some financial products may trade in illiquid markets. Illiquid markets may be characterized by wide NBBO spreads and low quantities of financial instruments available at the NBBO prices. Large market orders, for example, trading in illiquid markets may receive unfavorable prices. When the exchange receives a large market order, a portion of the market order may initially execute at NBBO prices, as expected. The remainder of the order may execute against limit orders in the order book at successively worse prices until the entire quantity of the market order is filled or the order book is cleared. Portions of large trades can thus execute at substantially worse prices than the NBBO price when the large trade was submitted. Sudden, large price movements may also adversely affect market participants and reduce system stability. As further discussed below, the present disclosure provides systems, methods and computer readable storage medium for addressing this issue.

The Figures (FIGS.) and the following description relate to particular embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

System Architecture

Turning now to FIG. 1, illustrated is a system architecture diagram of one example embodiment of an electronic trading system (ETS) in a networked environment. The system environment comprises market participants including one or more customer systems 101, agency broker systems 100, market maker systems 102, and/or proprietary trader systems 103. The market participants 100-103 are shown coupled to the ETS 105 through a wired and/or wireless network 104. The ETS 105 may also communicate with the NBBO database 120 through the network 104. Although only a single one of each type of market participant 100-103 is illustrated in FIG. 1, the environment may include fewer than all, one or more other participants (not shown) or a plurality of each in practice.

The customer systems 101 may comprise systems operated by customers (e.g., traders) that can issue electronic orders to buy or sell financial instruments in accordance with the needs of those customers. The customer systems 101 may communicate the electronic orders to the agency broker systems 100, either directly or through the network 104, or in some instances, directly to the ETS 105 through the network 104. The customer systems 101 may comprise personal computers, laptops, smart phones, tablet computers, computer servers, or any other systems capable of issuing electronic communication.

The agency broker systems 100 may be operated by agency brokers and may be configured to receive electronic orders from any number of customer systems 101. The agency broker systems 100 may include an ETS interface 110 that enables communication with the ETS 105. The agency broker systems 100 may issue orders to buy and sell financial instruments on behalf of customers, or they may issue orders for the agency brokers' own accounts. Orders may be sent through the ETS interface 110 to the ETS 105. Confirmations of issued orders may be received through the ETS interface 110 as well. The ETS interface 110 may provide standard electronic communications capabilities such as encryption, compression, routing, quality of service guarantees, and error correction.

The market maker systems 102 may be operated by market makers. Market makers, for purposes of this disclosure, are persons/entities that buy and sell financial instruments with the aim to profit from the spread between bids and offers. Because market makers may place non-marketable limit orders, market makers may provide liquidity in a financial market (or simply, a market). At a given time, market makers may simultaneously place buy and sell orders on the same financial instrument through the ETS 105. The market maker systems 102 may also include an ETS interface 110 that enable market makers to place orders with the ETS 105 and receive pricing and transactional information from the ETS 105.

The proprietary trader systems 103 may be operated by proprietary traders (PTs). PTs may be similar to agency brokers 100, but PTs may place orders on behalf of themselves rather than on behalf of customers. PT systems 103 may include an ETS interface 110 that enables PTs to place orders with the ETS 105 and receive pricing and transactional information from the ETS 105. PTs may engage in long, short, hedge, or arbitrage strategies and place orders on a side of financial instruments. In some instances, a firm may engage in both proprietary trading and market making, so that firm may have a trader system with characteristics of both market maker systems 102 and PT systems 103.

The ETS 105 may be configured as an electronic market that matches orders received from the market participants against each other. In that case, the ETS 105 may receive orders specifying a financial instrument, a quantity, and a side. For instance, the ETS 105 can match an order to sell a particular financial instrument from an agency broker system 100 against a different order to buy the same financial instrument from a market maker system 102, based on compatibility between the price criteria of the two orders. The ETS 105 may optionally be configured to enforce a trading collar on orders. As further discussed below, a trading collar comprises a mechanism that delays or prevents execution of an order at prices differing significantly from the prices prevailing when the order was initially received.

Exemplary Electronic Trading System

In the illustrated embodiment, the ETS 105 includes an order book 111, an order manager 112, an execution manager 113, and a reporting manager 114. The order book 111 may comprise a data storage module that stores orders received from the agency broker systems 100 the market maker systems 102, and/or the proprietary trader systems 103. The orders may be stored in records that specify the ordered financial instrument, the order price, the identity of the ordering party, the order's cancellation conditions, the order placement time, the order quantity, and/or any other pertinent or desired information. An order's cancellation conditions may indicate when an order is to be removed from the exchange (e.g., at a specific time, when a particular market conditions occurs, if the order is partially filled, only if the order is canceled, etc.). Some of this information may be omitted from order records (e.g., market orders may omit an order price). The ETS 105 may provide information from the order book 111 to the agency broker systems 100, the market maker systems 102 and/or the proprietary trader systems 103 on request. This information may be used to determine the price of various financial instruments in the current market. Some information from the order book 111 may be withheld from agency brokers, market makers and/or traders (e.g., the identity of an ordering party may be withheld).

The order manager 112 may be configured to match buy and sell orders in the order book 111 against each other to create transactions. These transactions may be matched based on price priority, for example. Other factors, such as time priority (or any other factor(s)), may be used secondary to price priority. For example, suppose the order book 111 has three limit orders to sell shares of ACME Company. One order is from broker X, to sell 10 shares of ACME Company at a price of at least $50 per share, received on January 1st. Another order is from broker Y, to sell 15 shares of ACME Company at a price of at least $50, received on January $2^{nd}$. The final order is from broker Z, to sell 5 shares of ACME Company at a price of at least $40, received on January $3^{rd}$. Further suppose the order book 111 receives a new limit order from agency broker W to buy 25 shares of ACME Company at a price of at most $55. The order manager 112 may match the 5 shares of broker Z's sell order against broker W's buy order first because broker Z offers the best selling price. Next the 10 shares of broker X's sell order may be executed against broker W's buy order because broker X's sell order was received prior to broker Y's sell order. Finally the remainder of broker W's buy order (5 shares) may be executed against a portion of broker Y's sell order. Notably, any desired factor may be used as a primary priority factor and any other factor may be used as a secondary priority factor.

The order manager 112 may be configured to match orders stored in the order book 111 until no more transactions can be completed. When the possible order matches have been exhausted, the lowest priced sell order for a given financial instrument may be priced higher than the highest priced buy order. These remaining orders may be referred to as non-marketable orders because they will not likely execute at prevailing prices. In some instances, the execution manager 113 may block execution of orders even though the orders' pricing criteria are met. As new orders are received by the ETS 105, the order manager 112 may attempt to match them against existing orders in the order book 111. Those orders that can be matched at prevailing prices may be referred to as marketable orders. Orders that cannot be matched against an existing order may be referred to as non-marketable orders and may be stored in the order book 111 until they are marketable. The ETS 105 may execute received market orders against the current highest-priced buy order or lowest-priced sell order stored in the order book 111, subject to collar restrictions that may by enforced by the execution manager 113.

The execution manager 113 may be configured to enforce regulations and policies of the ETS 105 over the operation of the order manager 112. The execution manager 113 may ensure that the ETS 105 does not execute orders at worse prices than those reported by the NBBO database 120. The execution manager 113 may also enforce a collar on marketable orders. The collar prevents execution of orders at prices worse than a collar price, which is based on prevailing prices. In one embodiment, the collar restricts execution to orders having a price better than a collar price. The collar price may shift over time and/or in response to execution or routing of certain orders. The collar price may be based, in part, on prices reported by the NBBO database 120, local BBO prices, and/or recently executed transaction prices. Additionally, the execution manager 113 may enforce risk management measures designed to spot erroneous or inadvertent trades.

The reporting manager 114 may be configured to transmit information about the ETS 105 to market participants 100-103 and the NBBO database 120. Transmitted information may include characteristics of executed orders (e.g., posting prices, quantity exchanged, etc.), characteristics of orders in the order book 111 and/or other information. Transmitted information may omit some orders in accordance with exchange policies; for example, stop market orders that have not reached an activation price may be omitted. The reporting manager 114 may transmit risk management information such as (without limitation) parameters of policies enforced by the execution manager 113 (e.g., collar parameters). Market participant systems 100-103 may display received information on their ETS interfaces 110. The reporting manager 114 may report the prices of the lowest priced sell order and highest priced buy order to the NBBO Database 120. The reporting manager 114 may include a web server, or an application programming interface (API) for communicating through the network 104.

Exemplary Computer System

Figure 2:
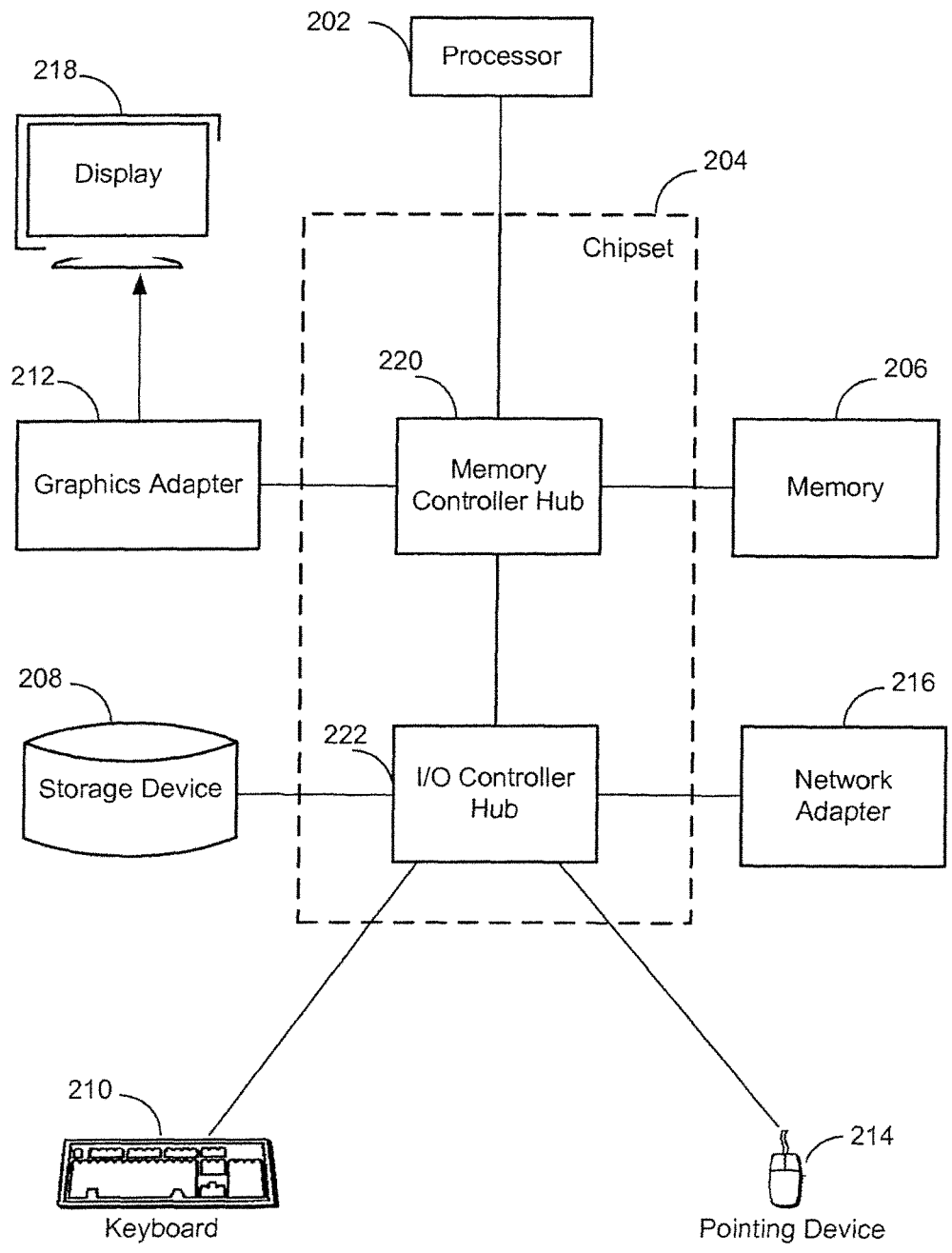
FIG. 2 illustrates a high-level block diagram of an example computer, consistent with one embodiment.

The customer system 101, the agency broker system 100, the market maker system 102, the PT system 103, and the ETS 105 may be implemented using one or more computers. FIG. 2 is a high-level block diagram illustrating an example computer 200. The computer 200 may optionally include at least one processor 202 coupled to one or more chipsets 204. The chipset 204 may include a memory controller hub 220 and an input/output (I/O) controller hub 222. A memory 206 and a graphics adapter 212 may be coupled to the memory controller hub 220, and a display 218 may be coupled to the graphics adapter 212. A storage device 208, keyboard 210, pointing device 214, and network adapter 216 may optionally be coupled to the I/O controller hub 222. Other embodiments of the computer 200 have different architectures including more, alternative and/or fewer components.

The storage device 208 may comprise a non-transitory computer-readable storage medium such as a hard drive, compact disk read-only memory (CD-ROM), DVD and/or a solid-state memory device. The memory 206 may hold instructions and data used by the processor 202. The processor 202 may include one or more processors 202 having one or more cores that execute instructions. The pointing device 214 may comprise a mouse, track ball or other type of pointing device, and may be adapted for use in combination with the keyboard 210 (or other input device(s)) to input data into the computer 200. The graphics adapter 212 may be configured to display images and other information on the display 218. The network adapter 216 in this embodiment couples the computer 200 to one or more wired and/or wireless computer networks.

The computer 200 may be adapted to execute computer program modules for providing functionality described herein. As used herein, the term "module" refers to computer program logic used to provide the specified functionality. Thus, a module can be implemented in hardware, firmware, and/or software. In one embodiment, program modules such as the order manager 112, execution manager 113, and reporting manager 114 are stored on the storage device 208, loaded into the memory 206, and executed by the processor 202.

The types of computers 200 that may be used by market participants and the ETS 105 of FIG. 1 can vary depending upon the embodiment and the processing power required by the entity. For example, the ETS 105 might comprise multiple blade servers working together to provide the functionality described herein. The computers 200 may contain duplicates of some components or may lack some of the components described above (e.g., a keyboard 210, a graphics adapter 212, a pointing device 214, a display 218, etc.). For example, the ETS 105 can run in a single computer 200 or multiple computers 200 communicating with each other through one or more wired and/or wireless networks such as in a server farm.

Exemplary Execution Manager

Figure 3:
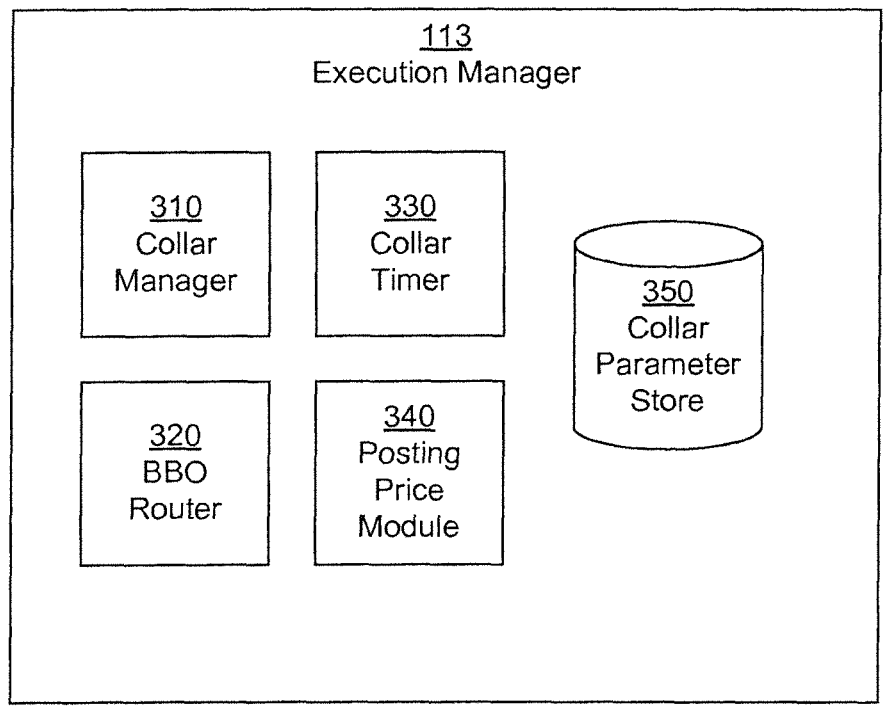
FIG. 3 illustrates a block diagram of an example execution manager for implementing a collar price, consistent with one embodiment.

FIG. 3 illustrates a block diagram of an example execution manager 113 for implementing a collar, consistent with one embodiment. This exemplary execution manager 113 comprises a computer program module, as defined above, and it includes a collar manager 310, a best bid/offer (BBO) router 320, a collar timer 330, a posting price module 340 and a collar parameter store 350. The execution manager 113 may include alternate or additional modules to those described (e.g., an errant trade detection module, a trade busting module, etc.). In an alternate embodiment, the functions of the modules may be combined or separated among modules of a different configuration. Alternate embodiments may omit and/or add at least one function or feature implemented in the described embodiments.

The collar manager 310 may be configured to enforce the collar on execution of marketable orders. As noted above, the collar may be configured to prevent execution of marketable orders at worse prices than a collar price. This collar price may be determined from an order's posting price modified by a collar range value (CRV). In one embodiment, the collar price may be more aggressive than the order's posting price by the CRV. Aggressive, in this context, refers to a worse price than the posting price. For example, a buy marketable order has a collar price equal to the CRV added to the posting price, and a sell marketable order has a collar price equal to the CRV subtracted from the posting price. The collar manager 310 may use the posting price module 340 to determine the initial posting price of the order. Subsequently, the collar manager 310 may move the posting price in response to 1) an order execution against the marketable order, 2) a more aggressive same-side BBO, and 3) expiration of the collar timer 330. Whenever the posting price moves, the collar manager 310 moves the collar price to maintain a difference between the posting price and the collar price equal to the CRV.

When the ETS 105 executes a trade against the marketable order, the posting price may adjust to the price at which the trade executed. These trades can execute at better prices (for a marketable order) than the collar price. The trade may execute due to a received order that is marketable at prices better than the collar price. Alternately or additionally, the trade may execute due to a non-marketable order from the order book 111 that has become marketable (at a price better than the collar price) due to a collar price move. For example, if the posting price is $3.50 and the CRV is $0.40, then the collar price for an outstanding market order to buy 100 instruments is $3.90. If a limit order to sell 30 at $3.70 or above is received, then the posting price on the remaining 70 instruments in the market order may move to $3.70, and the collar price moves to $4.10. If the received limit order to sell 30 specified a limit of $3.30, the trade would execute at $3.50 and the posting price would remain unchanged.

In one embodiment, the collar manager 310 ignores certain classes of marketable orders when moving the posting price and/or collar price. For example, the collar manager 310 may move the posting price to match executions against limit orders but ignore executions against received market orders. Example limit orders may include limit orders from an agency broker system 100 or a PT system 103 as well as limit orders on either side from a market maker system 102. Example market orders that may not move the posting price or collar price may include a market order received from a market participant, routed from another exchange, rejected from routing to another exchange, and/or activated by conversion of a stop order.

The BBO router 320 may be configured to monitor the NBBO and away BBOs reported by an NBBO database 120. When the NBBO or an away BBO gives a better price than the local BBO, the ETS 105 may route all or part of a marketable order to another exchange if the away price is better than the collar price. Routing an order may trigger the collar manager 310 to move the posting price and collar price to reflect the price of the executed order.

When the NBBO database 120 reports a BBO price on the same side of a marketable order, the posting price may adjust to match the more aggressive same side BBO. For example, suppose a market order to sell 100 shares has a posting price of $3.50, and the NBBO is $3.00-$3.50. If the CRV is $0.40, then the collar price is $3.10, so the sell order cannot execute against the national best bid at $3.00. If the NBBO subsequently updates to $3.00-$3.40, then the posting price and collar price update to $3.40 and $3.00, respectively. Since the national best bid is better than or equal to the collar price, the market order can sell against the national best bid at $3.00.

Expiration of the collar timer 330 may also move the posting price and the collar price to more aggressive prices. The collar timer 330 may tick when a marketable order is suspended because no opposite side trades are available at prices better than the collar price. When the collar timer 330 exceeds a collar time threshold, the collar timer 330 may inform the collar manager 310 and reset. The collar timer 330 may track the number of timer expirations that have occurred since a marketable order has been suspended due to the collar.

If the collar timer 330 exceeds the collar time threshold, the collar manager 310 may move to the posting price and the collar price according to a collar move parameter (CMP). For example, suppose a market order to buy 100 posts at $2.50 with a CRV of $0.40 for a collar price of $2.90. If there are no orders better than the collar price, the collar timer 330 runs. If the collar timer 330 exceeds the collar time threshold, then the posting price and collar price may move to a more aggressive price range. If the CMP is $0.30, then the example market order's posting price moves to $2.80 and the collar price moves to $3.20. Next, suppose that the ETS 105 receives a limit order to sell 50 at $3.00 or above, which executes against the market order to buy because it is a better price for the market order than the collar price. This leaves a market order to buy 50 and the posting price moves to $3.00 because of the executed trade.

In one embodiment, the collar manager 310 may reduce the CMP whenever the collar timer 330 expires. The decrease may be determined from the CMP and a timer expiration limit. For example, if the initial CMP is $1.00 and the timer expiration limit is 5, then the CMP may decrease by $0.20 when the collar timer 330 expires. Further suppose there is an imbalance due to a large market order on the sell side, the initial posting price is $16.00, the CRV is $1.00, no new orders are received, and the order book contains limit orders on the buy side bidding less than $13.00. Because no orders will execute, the collar timer 330 will run, expire, and reset until it reaches the timer expiration limit. The collar price and posting price in this example will move to $14.20 and $15.20, respectively, on the first expiration, $13.60 and $14.60 on the second expiration, $13.20 and $14.20 on the third expiration, and $13.00 and $14.00 on the fourth expiration. On the fifth expiration, the price collar range will not move and the balance of the order is canceled.

The posting price module 340 may be configured to determine the initial posting price of a received marketable order. In one embodiment, the posting price module 340 first determines if the market is wide in the relevant financial product. For purposes of this disclosure, a market is wide if the NBBO database 120 reports an NBBO width greater than a legal collar width parameter. For example, if the legal collar width is $0.40 and the NBBO is $3.00-$3.20, then the NBBO width is $0.20 and the market is not wide. In one embodiment, the reporting manager 114 communicates the initial posting price of the received marketable order to market participants 100-103.

If the market is wide, then the posting price may be the same side of the NBBO modified to be more aggressive by a first posting parameter. For example, suppose a market order is received to sell, the first posting parameter is $0.80, and the NBBO is $2.00-$3.40. The posting price may be $2.60, or $0.80 less than the lowest offer.

If the market is not wide, then the posting price may be the least aggressive of 1) the opposite side of the NBBO, and 2) the same side of the NBBO modified to be more aggressive by the first posting parameter. For example, suppose a market order is received to buy, the first posting parameter is $0.40, and the NBBO is $3.00-$3.20. The posting price is $3.20, which is the less aggressive of (1) $3.20, which is the opposite side NBBO, and (2) $3.40, which is $0.40 more than the same side NBBO.

The collar parameter store 350 may be configured to contain and store collar parameters, which may include (without limit) the CRV, the CMP, the legal collar width, the first posting parameter, the collar time threshold, the timer expiration limit and/or other parameters. The collar manager 310 may access and utilize the CRV, CMP, and timer expiration limit (as well as other parameters). The collar timer 330 may use (without limit) the timer expiration threshold. The posting price module 340 may use (without limit) the legal collar width and the first posting parameter. In one embodiment, the CRV, CMP, the legal collar width and the first posting parameter may vary based on the initial price. For example, if the price is below $2.00, the CRV may be $0.25, but if the price is at least $2.00 and no greater than $5, then the CRV may be $0.40. In one embodiment, the posting price module 340 may use different first posting parameters depending on whether the market is wide or not (e.g., a second posting parameter). A collar parameter may be specific to a financial instrument or a group of financial instruments, or a collar parameter may generally have the same value for the different financial products on the exchange.

Exemplary Trade Execution

Figure 4:
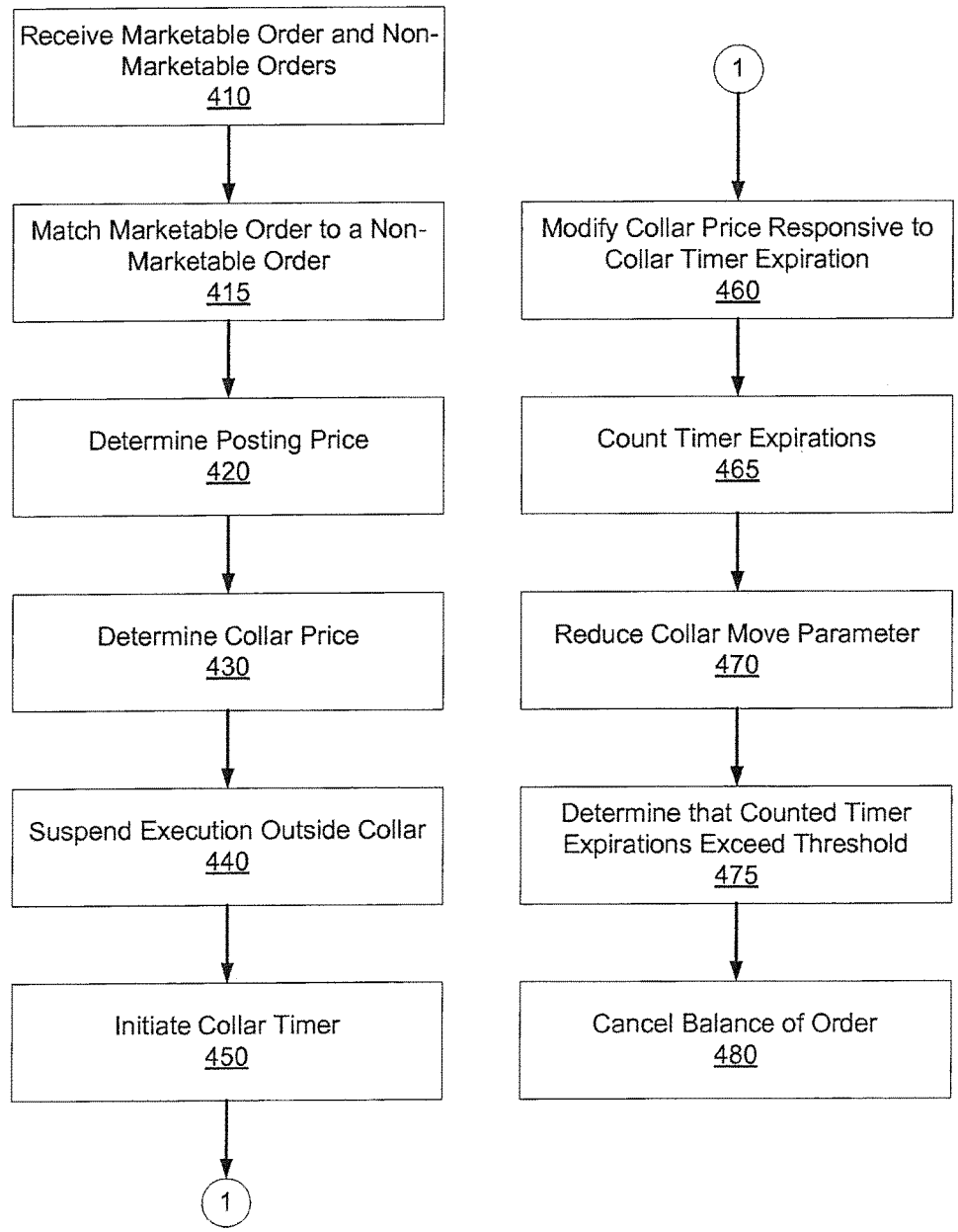
FIG. 4 illustrates an example flow chart for executing trades with a collar price, consistent with one embodiment.

FIG. 4 illustrates an example flow chart 400 for executing trades with collar protection, consistent with one embodiment. As a first step, an ETS (e.g., ETS 105) may receive 410 at least one marketable order and at least one non-marketable order from market participants. The marketable order may specify at least a side, a quantity and a financial instrument. Marketable orders may include one or more of a market order, marketable limit order, activated stop market order that has converted to a market order, and marketable order routed to an ETS. The non-marketable orders may specify at least a side, a quantity, a financial instrument and a limit price. These non-marketable orders may include non-marketable limit orders, marketable limit orders that were partially filled and have become non-marketable due to price changes, and non-marketable limit orders that have been rejected back to the ETS from a routing. Next, at step 415, an order manager (e.g., order manager 112) may match at least a portion of the quantity specified by the marketable order to a non-marketable order based on the prices of the non-marketable order. This matching may occur at a match price.

A posting price module (e.g., posting price module 340) then determines 420 a posting price based on at least one of a price of a recently executed order, a best bid price and a best offer price. These prices may be determined by an order manager or from an order book, or the prices may be received from an away exchange or an NBBO database. In one embodiment, the posting price module may modify one of these prices by the first posting parameter. A collar manager (e.g., collar manager 310) may determine 430 the collar price based on at least one of the best bid price and the best office price. In one embodiment, the collar price may be based on modifying the posting price by the CRV. The execution manager may halt or suspend 440 executions of trades outside the collar. This includes trades at prices worse than the collar price, from the perspective of the marketable order.

Responsive to the match price being worse than the determined collar price, the collar manager may initiate 450 a collar timer (e.g., collar timer 330). In one embodiment, the collar timer may be halted while trades execute. In an alternate embodiment, the execution manager may reset the collar timer whenever a trade executes. If the collar timer exceeds a time threshold, the collar timer may notify the collar manager. The collar manager may modify 460 the collar price and/or the posting price based on the CMP. Modifying the collar price may comprise moving the collar price towards the match price by the CMP. In one embodiment, the collar timer may count the number of timer expirations 465, and the collar manager may modify 470 the CMP based on the number of timer expirations. When the collar timer expires, the collar timer may reset and resume. In one embodiment, the execution manager may determine 475 that the counted timer expirations have exceeded the timer expiration limit. Responsive to this determination 475, the execution manager may cancel 480 at least the outstanding portion of the order. For example, orders designated as fill or kill may be canceled in their entirety even if a portion would have executed.

In one embodiment, the collar manager may modify the collar price based on receiving a new match from the order manager. The collar manager may determine that this received match price is better than the collar price for the marketable order and allow the trade to execute. The collar price may then be modified based on the match price that was better than the collar price. In one embodiment, the ETS receives away BBOs from an away exchange or away ETS. A BBO router (e.g., BBO router 320) may determine that the away BBO prices are better for the marketable order than prices of the non-marketable orders in the order book. In response, the BBO router may route at least a portion of the marketable order to the away exchange or away ETS, and the collar manager may modify the collar price based on the away BBO prices.

The described embodiments discuss an implementation that determines the posting price, collar price, and/or CMP by modifying, adding, and/or subtracting parameters from other quantities in an ETS. Modifying may include operations such as one or more of multiplication, division, percentages, exponentiation, differentiation, integration, or any non-linear functions. Alternate embodiments may modify these quantities or other collar parameters using random or pseudo-random numbers without departing from the disclosed subject matter.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for a system and a process for a limited movement price collar. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

The invention claimed is:

1. A computer-implemented method for reducing processing in an electronic computer system, comprising:
suspending active execution of orders upon the identification of a condition; and reactivating execution of orders upon resolution of the condition, such that the execution of orders only occurs in the absence of the condition, said suspending comprising:
receiving, by an electronic computer system, a marketable order and a plurality of non-marketable orders, the marketable order and the plurality of non-marketable orders each specifying at least one financial instrument, a quantity and a side, the plurality of non-marketable orders each further specifying a respective price, said electronic computer system comprising one or more computers comprising computer-readable instructions stored on a non-transitory computer readable storage medium and executed by at least one processor, the electronic computer system further comprising an execution manager module;

monitoring, by the execution manager module, market data comprising at least one of a best bid price, a best offer price, and a recently executed transaction price;

determining, by the execution manager module, a collar price based on the monitored market data;

matching, by the electronic computer system, at least a portion of the marketable order to a non-marketable order of the plurality of non-marketable orders based on the respective price of the non-marketable order, the matching occurring at a match price;

comparing, by the execution manager module, the match price to the determined collar price;

determining, by the execution manager module, that the match price is worse for the marketable order than the determined collar price based on the comparison;

suspending, by the execution manager module, an execution of the matched portion of the marketable order when it is determined that the match price is worse for the marketable order than the determined collar price;

adjusting, by the execution manager module, the collar price based on current monitored market data, said adjusting comprising:
  activating a timer when it is determined that the match price is worse for the marketable order than the determined collar price,
  comparing an elapsed time value of the activated timer to a predetermined elapsed time threshold,
  determining, based on the comparison, if the elapsed time value has exceeded the predetermined elapsed time threshold, and
  converting the collar price to a converted collar price based on a collar move parameter when it is determined that the elapsed time value of the activated timer has exceeded the predetermined elapsed time threshold; and transmitting, by a reporting manager of the electronic computer system, collar information comprising the converted collar price to at least one of a market participant computer system and a national best bid and offer (NBBO) database when the collar price is converted to the converted collar price.

2. The method of claim 1, wherein the converting of the collar price to the converted collar price further comprises:
counting, by the execution manager module, a number of timer expirations having occurred since the marketable order was received; and
reducing the collar move parameter based on the counted number of timer expirations.

3. The method of claim 2, further comprising:
determining, by the execution manager module, that the counted number of timer expirations exceeds a timer expiration limit; and
canceling, by the execution manager module, at least a portion of the marketable order that has not been matched to a non-marketable order among the plurality of non-marketable orders.

4. The method of claim 1, wherein the converting of the collar price further comprises adjusting, by the execution manager module, the collar price by the collar move parameter towards the match price.

5. The method of claim 1, wherein determining the collar price further comprises:
establishing, by the execution manager module, a posting price based on at least one of the recently executed transaction price, the best bid price and the best offer price; and
determining, by the execution manager module, the collar price as the posting price offset by a collar range value towards the match price.

6. The method of claim 5, wherein establishing the posting price further comprises:
determining, by the execution manager module, whether a legal collar width parameter exceeds a best bid-offer (BBO) difference between the best bid price and the best offer price;
establishing, by the execution manager module, the posting price as at least one of the best bid price increased by a first posting price parameter, and the best offer price decreased by the first posting price parameter, if the legal collar width parameter exceeds the BBO difference; and
establishing, by the execution manager module, the posting price as at least one of the best bid price, the best offer price, the best bid price increased by a second posting price parameter and the best offer price decreased by the second posting price parameter if the legal collar width parameter does not exceed the BBO difference.

7. The method of claim 5, further comprising:
modifying, by the execution manager module, the posting price based on the recently executed transaction price, the recently executed transaction price being associated with a marketable limit order.

8. The method of claim 1, further comprising:
receiving, by the electronic computer system, away best bid-offer (BBO) prices from an away electronic computer system;
determining, by the electronic computer system, that the away BBO prices at the away electronic computer system are better for the marketable order than available prices of the non-marketable orders;
routing, by the electronic computer system, at least a portion of the marketable order to the away electronic computer system; and
converting the collar price to a converted collar price based on the away BBO prices.

9. The method of claim 1, wherein the marketable order comprises an order executable against at least one non-marketable order of the plurality of non-marketable orders, and wherein the marketable order comprises at least one of a marketable limit order, a market order, an activated stop market order, a routed marketable limit order and a routed market order received by the electronic computer system.

10. The method of claim 1, wherein the non-marketable order comprises a non-marketable limit order or a marketable limit order that has become non-marketable, and wherein the respective price and a side of the non-marketable order precludes matching of the non-marketable order against any other non-marketable order among the plurality of non-marketable orders.

11. A non-transitory computer readable medium storing instructions for reducing processing in an electronic computer system, the electronic computer system comprising a processor and an execution manager module, the instructions, when executed by the processor, causing the electronic computer system to:
  suspend active execution of orders upon the identification of a condition; and
  reactivate execution of orders upon resolution of the condition, such that the execution of orders only occurs in the absence of the condition, said instructions to suspend active execution of orders including instructions that cause the electronic computer system to:
    receive a marketable order and a plurality of non-marketable orders, the marketable order and the plurality of non-marketable orders each specifying at least one financial instrument, a quantity and a side, the plurality of non-marketable orders each further specifying a respective price;
    monitor, by the execution manager module, market data comprising at least one of a best bid price, a best offer price, and a recently executed transaction price;
    determine, by the execution manager module, a collar price based on the monitored market data;
    match at least a portion of the marketable order to a non-marketable order of the plurality of non-marketable orders based on the respective price of the non-marketable order, the match occurring at a match price;
    compare, by the execution manager module, the match price to the determined collar price;
    determine, by the execution manager module, that the match price is worse for the marketable order than the determined collar price based on the comparison;
    suspend, by the execution manager module, an execution of the matched portion of the marketable order when it is determined that the match price is worse for the marketable order than the determined collar price;
    adjust, by the execution manager module, the collar price based on current monitored market data, said adjust defined by instructions to:
      activate a timer when it is determined that the match price is worse for the marketable order than the determined collar price,
      compare an elapsed time value of the activated timer to a predetermined elapsed time threshold,
      determine, based on the comparison, if the elapsed time value has exceeded the predetermined elapsed time threshold, and
      convert the collar price to a converted collar price based on a collar move parameter when it is determined that the elapsed time value of the activated timer has exceeded the predetermined elapsed time threshold; and
    transmit, by a reporting manager module, collar information comprising the converted collar price to at least one of a market participant computer system and a national best bid and offer (NBBO) database when the collar price is converted to the converted collar price.

12. The non-transitory computer readable medium of claim 11, wherein the instructions for converting the collar price to the converted collar price further comprise instructions to:
  count a number of timer expirations having occurred since the marketable order was received; and
  reduce the collar move parameter based on the counted number of timer expirations.

13. The non-transitory computer readable medium of claim 12, further comprising instructions to:
  determine that the counted number of timer expirations exceeds a timer expiration limit; and
  cancel at least a portion of the marketable order that has not been matched to a non-marketable order among the plurality of non-marketable orders.

14. The non-transitory computer readable medium of claim 11, wherein the instructions for converting the collar price to the converted collar price further comprise instructions to adjust the collar price by the collar move parameter towards the match price.

15. The non-transitory computer readable medium of claim 11, wherein the instructions for determining the collar price comprise instructions to:
  establish a posting price that is based on at least one of the recently executed transaction price, the best bid price and the best offer price; and
  determine the collar price as the posting price offset by a collar range value towards the match price.

16. The non-transitory computer readable medium of claim 15, wherein the instructions for establishing the posting price comprise instructions to:
  determine whether a legal collar width parameter exceeds a best bid-offer (BBO) difference between the best bid price and the best offer price;
  if the legal collar width parameter exceeds the BBO difference, establish the posting price as at least one of the best bid price increased by a first posting price parameter, and the best offer price decreased by the first posting price parameter; and
  if the legal collar width parameter does not exceed the BBO difference, establish the posting price as at least one of the best bid price, the best offer price, the best bid price increased by a second posting price parameter and the best offer price decreased by the second posting price parameter.

17. The non-transitory computer readable medium of claim 15, further comprising instructions to:
  modify the posting price based on the recently executed transaction price, the recently executed transaction price being associated with a marketable limit order.

18. The non-transitory computer readable medium of claim 11, further comprising instructions to:
  receive away best bid-offer (BBO) prices from an away electronic computer system;
  determine that the away BBO prices at the away electronic computer system are better for the marketable order than available prices of the non-marketable orders;
  route at least a portion of the marketable order to the away electronic computer system; and
  convert the collar price to a converted collar price based on the away BBO prices.

19. The non-transitory computer readable medium of claim 11, wherein the marketable order comprises an order executable against at least one non-marketable order of the plurality of non-marketable orders, and the marketable order comprises at least one of a marketable limit order, a market order, an activated stop market order, a routed marketable limit order and a routed market order received by an electronic computer system.

20. The non-transitory computer readable medium of claim 11, wherein the non-marketable order comprises a non-marketable limit order or a marketable limit order that has become non-marketable, and wherein the respective price and a side of the non-marketable order precludes matching of the non-marketable order against any other non-marketable order among the plurality of non-marketable orders.

21. An electronic computer system configured for reducing processing, comprising:
one or more computers comprising computer-readable instructions stored on a non-transitory computer readable storage medium and executed by at least one processor, said instructions, when executed, causing the one or more computers to:
suspend active execution of orders upon the identification of a condition; and reactivate execution of orders upon resolution of the condition, such that the execution of orders only occurs in the absence of the condition, said instructions to suspend active execution of orders including instructions that cause the one or more computers to:
receive a marketable order and a plurality of non-marketable orders, the marketable order and the plurality of non-marketable orders each specifying at least one financial instrument, a quantity and a side, the plurality of non-marketable orders each further specifying a respective price;
monitor, by an execution manager module embodied on at least one of the one or more computers, market data comprising at least one of a best bid price, a best offer price and a recently executed transaction price;
determine, by the execution manager module, a collar price based on the monitored market data;
match, by the execution manager module, at least a portion of the marketable order to a non-marketable order of the plurality of non-marketable orders based on the respective price of the non-marketable order, the match occurring at a match price;
compare, by the execution manager module, the match price to the determined collar price;
determine, by the execution manager module, that the match price is worse for the marketable order than the determined collar price based on the comparison;
suspend, by the execution manager module, an execution of the matched portion of the marketable order when it is determined that the match price is worse for the marketable order than the determined collar price; and
adjust, by the execution manager module, the collar price based on current monitored market data, said adjust defined by instructions to:
activate a timer when it is determined that the match price is worse for the marketable order than the determined collar price,
compare an elapsed time value of the activated timer to a predetermined elapsed time threshold,
determine based on the comparison of the elapsed time value of the activated timer to the predetermined elapsed time threshold, if the elapsed time value has exceeded a predetermined elapsed time threshold, and
convert the collar price to a converted collar price based on a collar move parameter when it is determined that the elapsed time value of the activated timer has exceeded the predetermined elapsed time threshold; and
transmit, by a reporting manager module of the electronic computer system, collar information comprising the converted collar price to at least one of a market participant computer system and a national best bid and offer (NBBO) database when the collar price is converted to the converted collar price.

22. The electronic computer system of claim 21, further comprising instructions that, when executed, cause the execution manager module to:
count a number of timer expirations having occurred since the marketable order was received; and
reduce the collar move parameter based on the counted number of timer expirations.

23. The electronic computer system of claim 22, further comprising instructions that, when executed, cause the execution manager module to:
determine that the counted number of timer expirations exceeds a timer expiration limit; and
cancel at least a portion of the marketable order that has not been matched to a non-marketable order.

24. The electronic computer system of claim 21, further comprising instructions that, when executed, cause the execution manager module to:
adjust the collar price to the converted collar price by the collar move parameter towards the match price.

25. The electronic computer system of claim 21, further comprising instructions that, when executed, cause the execution manager module to:
establish a posting price that is based on at least one of the recently executed transaction price, the best bid price and the best offer price; and
determine the collar price as the posting price offset by a collar range value towards the match price.

26. The electronic computer system of claim 25, further comprising instructions that, when executed, cause the execution manager module to:
determine whether a legal collar width parameter exceeds a best bid-offer (BBO) difference between the best bid price and the best offer price;
if the legal collar width parameter exceeds the BBO difference, establish the posting price as at least one of the best bid price increased by a first posting price parameter, and the best offer price decreased by the first posting price parameter; and
if the legal collar width parameter does not exceed the BBO difference, establish the posting price as at least one of the best bid price, the best offer price, the best bid price increased by a second posting price parameter and the best offer price decreased by the second posting price parameter.

27. The electronic computer system of claim 25, further comprising instructions that, when executed, cause the execution manager module to:
modify the posting price based on the recently executed transaction price, the recently executed transaction price being associated with a marketable limit order.

28. The electronic computer system of claim 21, further comprising instructions that, when executed, cause the one or more computers to:
receive away best bid-offer (BBO) prices from an away electronic computer system
determine that the away BBO prices at the away electronic computer system are better for the marketable order than available prices of the non-marketable orders;
route at least a portion of the marketable order to the away electronic computer system; and
convert the collar price to a converted collar price based on the away BBO prices.

29. The electronic computer system of claim 21, wherein the marketable order comprises an order executable against at least one non-marketable order of the plurality of non-marketable orders, and the marketable order comprises at least one of a marketable limit order, a market order, an activated stop market order, a routed marketable limit order and a routed market order received by said electronic computer system.

30. The electronic computer system of claim 21, wherein the non-marketable order comprises a non-marketable limit order or a marketable limit order that has become non-marketable, and wherein the respective price and a side of the non-marketable order precludes matching of the non-marketable order against any other non-marketable order among the plurality of non-marketable orders.

\* \* \* \* \*